Oct. 6, 1970          B. P. FARKAS          3,532,303
AIR DEVICE OF FLYING VEHICLE WITH THE SHAPE OF A DISH
THAT CAN DISPLACE ITSELF IN ANY DIRECTION
Filed Jan. 11, 1966          2 Sheets-Sheet 1
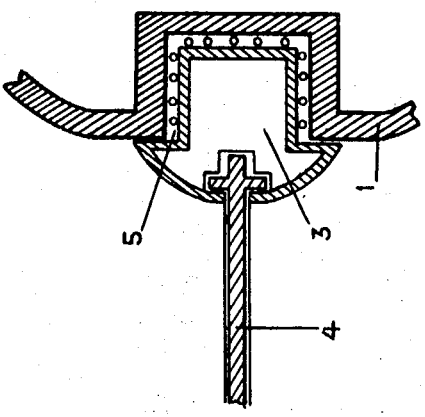
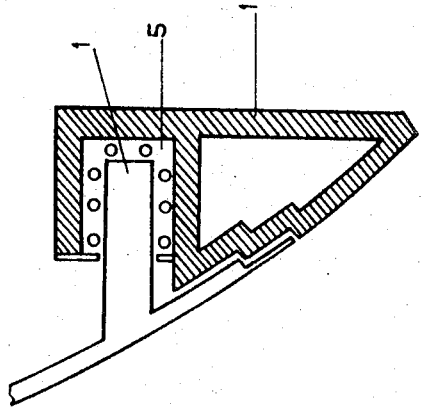
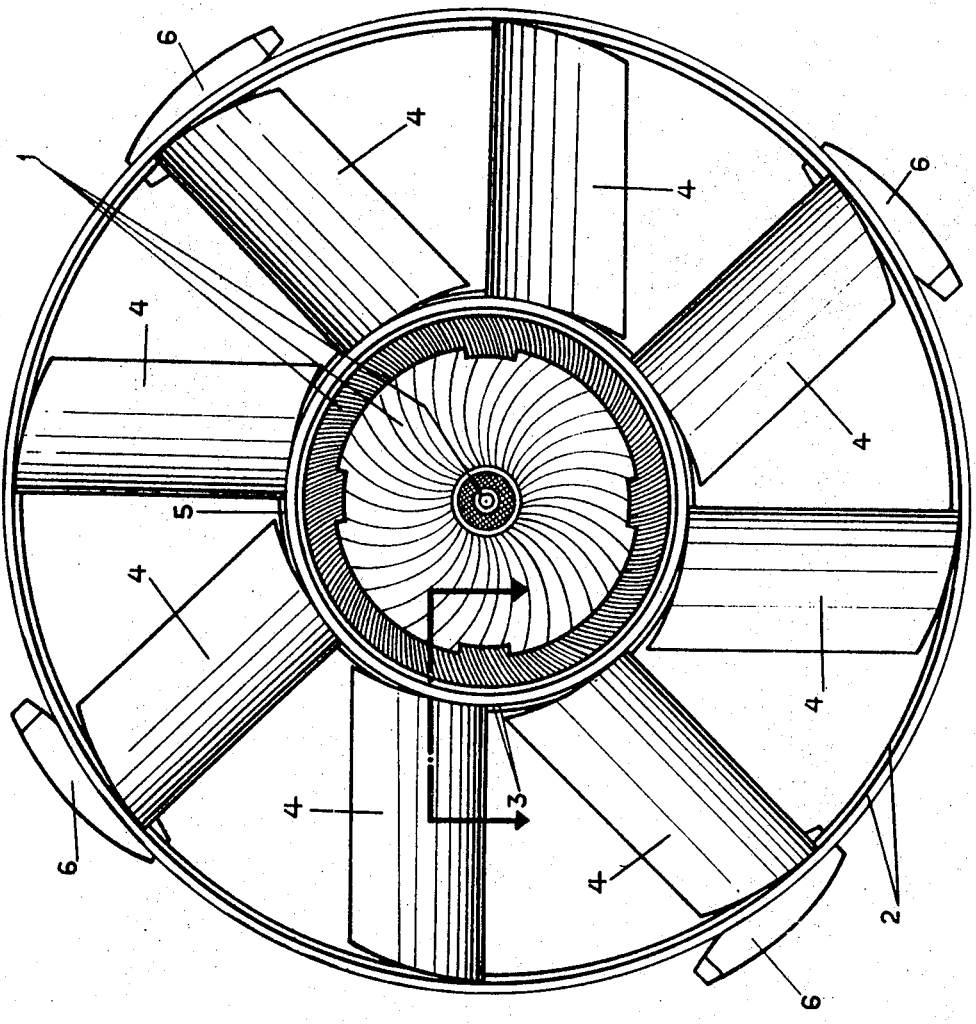

Oct. 6, 1970    B. P. FARKAS    3,532,303
AIR DEVICE OF FLYING VEHICLE WITH THE SHAPE OF A DISH
THAT CAN DISPLACE ITSELF IN ANY DIRECTION
Filed Jan. 11, 1966    2 Sheets-Sheet 2

3,532,303
AIR DEVICE OF FLYING VEHICLE WITH THE
SHAPE OF A DISH THAT CAN DISPLACE ITSELF
IN ANY DIRECTION
Bela Pontai Farkas, 1.067 Valenzuela-Castello,
Santiago, Chile
Filed Jan. 11, 1966, Ser. No. 538,521
Int. Cl. B64c 29/00
U.S. Cl. 244—23                                    1 Claim

ABSTRACT OF THE DISCLOSURE

A disc-shaped aircraft comprises a central cabin and an outer ring structure which is shiftable around the central cabin and consists of an inner and an outer ring with tiltable blades connecting said rings. Rockets at the central body serve for the propulsion in any direction, and rockets tangentially disposed at the outer ring produce rotation.

---

This invention consists of an air device and space vehicle offering incomparable flying safety even under the most adverse technical, meteorological or instrumental conditions, the vertical ascending and descending motion of which is independent of its horizontal multidirectional motion and which, on account of its particular shape, can be denominated a flying dish; it and/or its principle being characterized by being made up by two portions inter-dependent of one another, of appropriate size and circular streamlined shape, the first constituting the fixed carrying central body, around which an elevating ring of sufficient width revolves freely in an independent horizontal circular motion, connected with the central carrying body by means of a system of rolling or sliding support-connection or other system suitable to the case; such second main portion being composed of two rings, one inside and one outside, of due dimensions and shape, proportionately and equitably spaced between themselves within the same horizontal plane, two or several elevating vanes or blades being located between them and arranged in the form of a horizontal fan in relation to the center of the central carrying body, forming lateral angles with the rings in the proportion required by the case and fastened by their ends to both rings in a fixed or rotating position adjustable towards their sides; one or several rockets or other type of propulsion of adequate size and shape being installed on the outside ring, all of them operating at the same angle or horizontal thrust position in relation to the longitudinal axis of the nearest vanes or blades, their propulsive energies being ejected in one single horizontal circular elevating direction, their synchronous operation originating the horizontal circular revolving motion of the elevating-ring strip which, by means of the elevating vanes or blades, and according to the revolving speed and the angles of the vanes or blades, goes up slowly or rapidly in a vertical direction together with the carrying central body which, in turn, is equipped with rockets or other type of propulsion of appropriate size installed on the place most suitable to its operation in thrusting position or of multidirectional or unidirectional horizontal propulsion, either fixed or gradually rotary-adjustable, in which case this propulsive portion belonging to the central carrying body is joined to the remaining portion by means of a rolling or sliding support-connection system or other appropriate system, producing—through the operation of that system and of the propulsive equipment installed on the central body—the horizontal displacement of this flying vehicle in any desired direction. It may be inferred from this that this invention offers the technical possibility of using the two independent motions both separately and in conjunction, according to the existing variations and combinations.

For instance, through the operation of only the propulsive portion of the elevating-ring-strip, the vehicle can ascend or descend slowly or rapidly as the case may be, but always vertically.

The vehicle can also ascend or descend either slowly or rapidly as the case may be, but in a line diagonal or tangent to the earth surface, if the impulsive power of the two main parts is operated jointly at the same time or at least at frequent intervals.

In other cases, it is possible to reduce the revolving motion of the elevating-ring-strip to a moderate speed, thus securing only the necessary suspension of the apparatus, which can also be achieved by changing the angles of the elevating vanes or blades without modifying the speed of the revolving motion, or by the combination of both actions at a time, thus causing this creative invention to move horizontally at the speed determined by the impulsive forces of the central body in the direction of or toward the selected target.

When desired, the impulsive power of the central body can be disconnected and the elevating-ring-strip kept in operation at the speed of revolving motion required for its horizontal stabilization in the air. Thus it will remain in a position of floating suspension or motionless with respect of the lateral directions, and for discending vertically it needs nothing else but—once the impulsive power of the central body has been disconnected—to reduce the speed of the revolving motion of the elevating-ring strip below the speed necessary for the floating suspension, or reduce the angles of its vanes or blades by the required degree or both maneuvers at the time, and then it will rest upon the earth or water, should it be fitted for it, in the smoothest imaginable way.

This invention offers, an unquestionably higher flying safety never before existing against possible accidents, specially during take-offs and landings, which are the most dangerous moments in the course of flight, and also offers a safety never before imagined in the hard moments of storms, fogs, invisibility or disability of instruments, motors, etc., fatal circumstances generally being the cause of deadly accidents, thus eliminating the consequential huge damages to material, goods and other items transported as well as irretrievable loss of human life, thus forming for all of them the most convenient conditions to achieve their original and main purposes with the greatest safety and efficiency.

In the event of breaking or dissability of the motors or horizontal rockets of the central body, their sources of power are immediately disconnected and, should it be required by the circumstances, by increasing or reducing the revolving speed of the elevating-ring strip and changing the angels of the elevating vanes or blades as required, a smooth and vertically checked landing is to be initiated on the nearest previously selected spot, taking into account during the operation the actual direction and strength of the wind against the horizontal inertia of the apparatus.

In the case of break or dissability of the motors or jet impellers of the elevator-ring strip, even though the failure of several rockets or motors at the same time is little probable, and that this system of the elevating-ring-strip can preferably operate with one single motor, however, considering such difficult case, the horizontal driving forces are immediately disconnected and opening the angles of the elevating vanes or blades to the maximum convenient position, the apparatus is allowed to drop slowly, as the force of the air drought produced between the openings of the vanes by the vertical drop of the apparatus, with a tremendous strength, will cause the elevating-ring strip to revolve with sufficient speed to check the free drop of the apparatus, the position or failing direction of which can be in turn adjusted and oriented by short and occasional impulses of the horizontal impelling forces.

In the event of storms, fogs, invisibility, or failure of instruments, very specially if it occurs among mountains, the horizontal driving force is disconnected and the elevating vertical force maintained to the same revolving speed, taking care of not changing the horizontal position of the apparatus by means of timely shots of the horizontal driving forces in the direction that may be required to amend the desired permanent position, remaining floating at the same height and position but motionless in relation to the lateral displacement, until the adverse circumstances change, or otherwise, a slow descent can be initiated. In carrying out the latter operation, same may be aided by means of very thin and flexible rods extensible to several meters away from the edge of the elevating-ring-strip in horizontal directions and from different points underneath the central body downwards in vertical and semi-diagonal lateral directions, feeling the soil like a blindman with his stick, until effecting a perfect and smooth landing even under such circumstances, being warned by such rods of any possible obstacles in a rugged and uneven land, and making it possible to correct the position of the vehicle by means of short impulses given by the horizontal impelling forces at the suitable moments.

In the case of an unforeseen vertical obstacle arising in the horizontal course of the apparatus, the direction of the horizontally acting force can be immediately reversed, and at the same time give maximum aperture to the angles of the elevating vanes or blades and also give maximum revolving speed to the elevating ring strip, thus avoiding by means of a sort of violent braking and jumping upwards, the imminent clash against the obstacle, and a consequential catastrophic disaster.

The creation of this invention was born out of the primary necessity of a higher safety than what was known up to now for the flying course under the adverse and dreadful circumstances likely to cause deadly accidents, clashes or downfall of the vehicles and their passengers.

In the second place we have the economic aspect, affecting on the one hand the enterprises and/or owners of the planes and/or other flying vehicles, carriers, cargo, goods and other items transported in the case of loss of same, and/or on the other hand affecting the manufacturing enterprises of planes or flying transportation vehicles and their customers, as by using this creation, it is possible to move bigger loads and increase the present loading capacity of the air transportation means. At the same time, with the greater operability of this invention, there will be a world-wide increase in the number of places accessible for the direct air transportation, due to the fact that since the landing operation can be made in a fully vertical line, it is possible to use as airport any small place without the need of any preparation of the ground, thus providing best and insuperable conditions for air transportation in general, conditions unrivalled by other means of air transportation known so far involving unsuspected economy in this field.

All these vital needs, both urgent and practical, technical problems, determining factors, effects and conditions never satisfied with the resources known up to now, are solved in a most satisfactory manner with the application of this invention, as it meets all the required characteristics and details for the better fulfillment of these main purposes mentioned and established above.

In order that the present invention may be clearly understood, it is described with reference to the attached drawings, wherein:

FIG. 1 is a top view of this invention in its simplest shape and in a motionless landed position.

FIG. 2 is a fragmentary vertical section showing the rolling connection between the main body and the rotating vanes; FIG. 3 is a fragmentary vertical section of the rolling joint connections between the upper and lower portions of the main body.

FIG. 3 is an elevation from behind the vehicle, in its simplest shape and in a still, already landed position.

Figure 4:
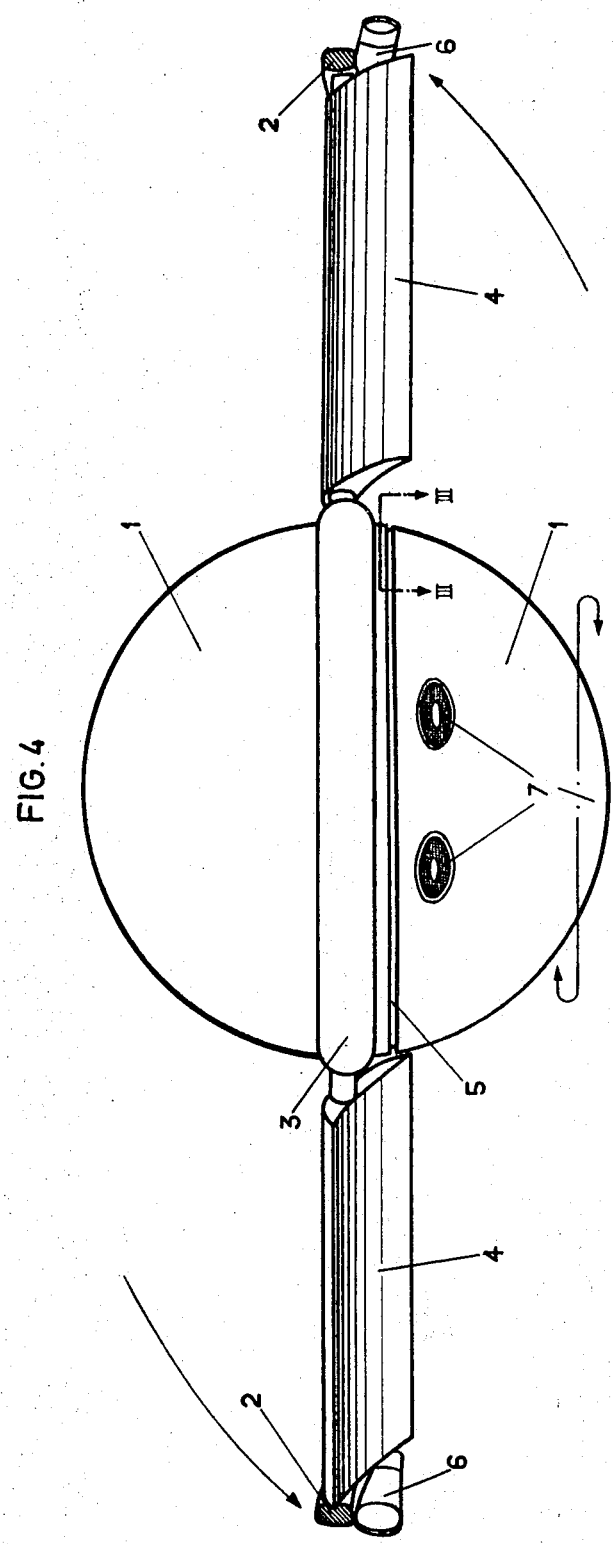

In all these figures, equal reference numbers indicate parts that are equal or corresponding.

The part number 1 of FIGS. 1, 2, 3 and 4 of this invention, consists of a carrying central body in the shape of a spherical streamlined shell, around which, like in a horizontal belt, revolves freely the second main part of this invention, i.e., an elevating-ring-strip, in a horizontal circular motion and independently of the motionlessness or any movement in any direction of the first main part of this invention, or carrying central body, the union with which of the elevating-ring-strip is achieved by means of a rolling or sliding support-connection system which is part No. 5 of FIGS. 1 and 2.

Part 2 of FIGS. 1 and 4 of this invention, is the outside ring of the elevating-ring-strip and its operating purpose is manifold. It serves as stabilizing connection between all the outside ends of all the elevating vanes or blades. As a counter-support, it holds the outside tip of the longitudinal axis of the vanes or blades, facilitating the possibility of these being rotary, by changing their angles in relation to the horizontal plane in accordance with flying operational requirements. It serves as inertia wheel, increasing the driving force as a counterweight in a centrifugal position. It serves as possible support for the rockets, for storing fuel, as conductor for diverse powers, etc.

Part 3 of FIGS. 1, 2 and 4 of this invention is the inside ring of the elevating-ring-strip and its operating purpose is manifold. It serves as supporting base for the inside end of the longitudinal axis of all the elevating vanes or blades. It also serves as inertia wheel for the revolving motion of the elevating-ring group, although, of course in a much lesser degree than the outside ring, increasing the driving force with its counterweight in a centrifugal position in relation to the imaginary center of the revolving motion of which it forms part. It serves as the base for the connection of the elevating-ring-strip with the central carrying body, that is the part 1, by means of a system of rolling or sliding support-connection, i.e., by means of part 5 of FIGS. 1, 2, 3 and 4. It also can serve for storaging fuel, for carrying different kinds of energies, etc.

Part No. 4 of FIGS. 1, 2 and 4 of this invention are the elevating vanes or blades of the second main part of it, that is, the elevating-ring strip, and with their streamlined shapes and semi-bended at different angles with respect to the horizontal plane as a whole and with their revolving motions of adequate speed around the first main part of this invention, that is, around the central carrying body, in a free horizontal motion, serve as support in the air for the vehicle and for elevating or lowering it vertically as may be desired by the pilot driving it.

Part 5 of FIGS. 1, 2, 3 and 4 of this invention is a system of support-connection, either rolling or sliding, which, in its different shapes and aspects serves, in the first place, as connection between the central carrying body, that is, part 1, and the elevating-ring-strip, or second main part of this invention, by means of the inside ring of the latter and also serves for the rolling connection of a portion of the central carrying body designated as driving part of it, with the rest of the central body, that is, the first main part of this invention. The operation of part 5 is accessory of the group formed by parts 1, 2, 3, and 4, as in any of its shapes and/or applications, it cooperates with, helps, facilitates and realizes the technical possibility of the revolving horizontal motion, both of the elevating-ring-strip in a fully free way around part 1, and of the propulsive part of the central carrying body around the imaginary vertical axis of the latter, consequently, permanently ensuring the good performance of the vital parts of the flying vehicle of this invention.

Parts No. 6 of FIGS. 1 and 4 of this invention, are the jet propellers or other type of propulsion of proportional size and shape, installed on the outside ring in the most suitable way, all of them working at an equal angle or horizontal thrust in relation to the longitudinal axis of the nearest vanes or blades and expelling their impelling power in a single elevating horizontal circular direction, their synchronous operation originating the horizontal revolving motion of the elevating-ring strip.

Parts numbered 7 of FIG. 4 of this invention are the rocket or rockets or other type of adequate size propulsion, installed at the most suitable place on the central carrying body in operating shot position or of unidirectional or multi-directional horizontal propulsion, either fixed or gradually turning-adjustable, in which case this driving portion belonging to the central carrying body can make horizontal revolving motions independently of the position of the rest of part 1, thus achieving—by means of this impelling equipment—the horizontal displacement of the flying vehicle of this invention in any desired horizontal direction.

It remains understood that this invention is by no means restricted to the descriptive example herein presented, but same is liable to the introduction of different modifications as to shape and/or principle and/or details, which are to be comprised within the range of the following claim.

I claim:
1. A generally disc-shaped aircraft comprising a central body means subdivided at a medial horizontal plane into an upper body and a lower body, said two bodies being shiftable with respect to each other about a central vertical axis, one of said bodies being provided with rocket motor means arranged for exerting thrust force in a horizontal direction, annular lifting means comprising inner ring means revolubly connectded with said central body means, outer ring means and a plurality of radially extending vanes connected at their respective extremities with said inner and outer ring means, and a plurality of rocket motor means attached to said outer ring means, said last mentioned rocket motor means being arranged for exerting thrust force in generally tangential and downward directions for rotating said annullar lifting means.

References Cited

UNITED STATES PATENTS

| | | | |
|---|---|---|---|
| 2,718,364 | 9/1955 | Crabtree | 244—12 |
| 3,054,578 | 9/1962 | Brocard | 244—23 |
| 3,199,809 | 4/1965 | Modesti | 244—12 |

FOREIGN PATENTS 678,700   1/1964   Canada.

MILTON BUCHLER, Primary Examiner

T. BUCKMAN, Assistant Examiner